US012700993B2

(12) United States Patent
Stapleton

(10) Patent No.: US 12,700,993 B2
(45) Date of Patent: Aug. 4, 2026

(54) KEY MANAGEMENT USING ATTRIBUTE CERTIFICATES (KXAC)

(71) Applicant: Wells Fargo Bank, N.A., San Francisco, CA (US)

(72) Inventor: Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 203 days.

(21) Appl. No.: 18/128,717

(22) Filed: Mar. 30, 2023

(65) Prior Publication Data

US 2024/0333477 A1     Oct. 3, 2024

(51) Int. Cl.
 *H04L 9/08*      (2006.01)
 *H04L 9/32*      (2006.01)
(52) U.S. Cl.
 CPC .......... *H04L 9/0825* (2013.01); *H04L 9/3268* (2013.01)
(58) Field of Classification Search
 CPC .... H04L 9/0825; H04L 9/3268; H04L 9/3263
 See application file for complete search history.

(56) References Cited

U.S. PATENT DOCUMENTS

| | | | | |
|---|---|---|---|---|
| 6,353,886 | B1 * | 3/2002 | Howard | H04L 41/0894 |
| | | | | 713/153 |
| 11,888,997 | B1 * | 1/2024 | Bowen | H04L 9/3247 |
| 12,137,175 | B1 * | 11/2024 | Sharma | H04L 9/3268 |
| 2002/0073308 | A1 * | 6/2002 | Benantar | H04L 9/3263 |
| | | | | 713/155 |
| 2004/0039906 | A1 * | 2/2004 | Oka | H04L 63/104 |
| | | | | 713/156 |
| 2006/0048228 | A1 * | 3/2006 | Takemori | H04L 9/40 |
| | | | | 713/168 |
| 2006/0277417 | A1 * | 12/2006 | Oikawa | H04L 63/0823 |
| | | | | 713/193 |
| 2010/0122081 | A1 * | 5/2010 | Sato | H04L 9/3263 |
| | | | | 713/158 |

* cited by examiner

*Primary Examiner* — Hany S. Gadalla
(74) *Attorney, Agent, or Firm* — Foley & Lardner LLP

(57)     ABSTRACT

The present disclosure is directed to systems, methods, and non-transitory computer-readable media including providing an attribute certificate to a Key Receiving Device (KRD). The attribute certificate indicates that the KRD is bound to a Key Distribution Host (KDH) for key distribution. A whitelist is provided to the KDH. The whitelist includes a list of at least one KRD bound to the KDH.

19 Claims, 8 Drawing Sheets

| X.509 Certificate | Description |
|---|---|
| Certificate Version | most current is v3 |
| Certificate Serial Number | unique number relative to the CA that issued the certificate |
| Certificate Signature Algorithm | signature and hash algorithms used to sign the certificate |
| Issuer Name | CA name that issued the certificate |
| Validity Dates | dates of not-before and not-after (expiration) usage |
| Subject Name | public key owner name |
| Subject Public Key | public key information |
| Extensions | only used for v3 |
| Certificate Signature | CA generated signature over the previous fields |

FIG. 2

| X.509 Extension | Description |
|---|---|
| Extension ID | Object Identifier (OID) that defines the extension |
| Extension Critical Flag | Boolean value either true or false |
| Extension Value | Format and content dependent on the OID |

FIG. 3

| X.509 Attribute Certificate | Description |
|---|---|
| Certificate Version | most current is v2 |
| Holder Identifier | identifies the owner of the attribute certificate |
| Issuer Name | AA name that issued the attribute certificate |
| Certificate Signature Algorithm | signature and hash algorithm used to sign the attribute certificate |
| Certificate Serial Number | unique number relative to the AA that issued the attribute certificate |
| Validity Dates | dates of not-before and not-after (expiration) usage |
| Attributes | |
| Extensions | |
| Certificate Signature | AA generated signature over the previous fields |

FIG. 4

| X.509 Attribute | Description |
|---|---|
| Type ID | Object Identifier (OID) that defines the attribute |
| Values | Format and content dependent on the OID |

FIG. 5

KEY MANAGEMENT USING ATTRIBUTE CERTIFICATES (KXAC)

BACKGROUND

Conventional symmetric key distribution mechanisms using asymmetric techniques (e.g., as disclosed in TR-34) presumes that a Key Distribution Host (KDH) and a Key Receiving Device (KRD) have a trust relationship as both the KDH and the KRD have a certificate issued from the same Public Key Infrastructure (PKI) domain. Two devices (e.g., individual users or companies) that may have X.509 public key certificates from the same Certificate Authority (CA) know only that the subject name in the certificates is bound to that public key based on the CA signature. However, the two devices have realistically no reason to enter into a trust relationship. For example, two KDHs from the same manufacturer can be used to distribute keys to a same set of KRDs under the conventional schemes as long as those KDHs have certificates signed by the same CA (e.g., the CA associated with a manufacturer), even though one KDH is authorized to distribute keys and another is not authorized to do so.

In addition, conventional symmetric key distribution mechanisms using asymmetric techniques (e.g., as disclosed in TR-34) requires the public key certificates for the KDH and the KRD to be issued from the same PKI domain (e.g., the KRD manufacturer), thus restricting the KDH from using another CA for its public key certificate. This further causes the KDH to manage multiple public key certificates for multiple KRDs, one for each KRD manufacturer.

In some scenarios in which the KRD and KDH operate locally, the KRD and KDH cannot access online revocation services, thus Certificate Revocation List (CRL) and Online Certificate Status Protocol (OCSP) cannot be enforced. Further, given that the KDH and KRD public key certificates are issued from a CA that operate within the same manufacturer's domain, consequently, the KDH and KRD implicitly trust each other's certificates such that certificate validation to a trusted root CA is not performed.

SUMMARY

The arrangements disclosed herein relate to systems, apparatuses, non-transitory computer-readable media, and methods for providing an attribute certificate to a KRD, the attribute certificate indicating that the KRD is bound to a KDH for key distribution and providing a whitelist to the KDH, wherein the whitelist comprises a list of at least one KRD bound to the KDH for the key distribution, the at least one KRD comprising the KRD.

The arrangements disclosed herein relate to systems, apparatuses, non-transitory computer-readable media, and methods for receiving, by a KDH, a whitelist comprising a list of at least one KRD bound to the KDH for key distribution and communicating with each of the at least one KRD for the key distribution based on the whitelist. Each of at least one KRD communicates with the KDH based on an attribute certificate indicating that each of the at least one KRD is bound to the KDH for the key distribution.

The arrangements disclosed herein relate to systems, apparatuses, non-transitory computer-readable media, and methods for receiving, by a KRD, an attribute certificate indicating that the KRD is bound to a KDH for key distribution and communicating by the KRD with the KDH for the key distribution based on the attribute certificate. The KDH communicates with the KRD based on a whitelist including a list of at least one KRD bound to the KDH for the key distribution. The at least one KRD includes the KRD.

These and other features, together with the organization and manner of operation thereof, will become apparent from the following detailed description when taken in conjunction with the accompanying drawings.

BRIEF DESCRIPTION OF THE DRAWINGS

FIG. 2 is a table illustrating a public key certificate, according to various arrangements.

FIG. 3 is a table illustrating subfields of each extension field of a public key certificate, according to various arrangements.

FIG. 4 is a table illustrating an attribute certificate, according to various arrangements.

FIG. 5 is a table illustrating subfields of each attributes field of the attribute certificate, according to various arrangements.

DETAILED DESCRIPTION

The arrangements disclosed herein are directed to systems, methods, non-transitory computer-readable media, and apparatuses for enabling reliable key distribution between a KDH and multiple KRDs by the manufacturer of the KRD using attribute certificates (e.g., X.509 attribute certificates). In some arrangements, the KDH is provided a KRD whitelist containing a collection of X.509 attribute certificates. A trust relationship between a KRD and an authorized KDH can be enabled using an attribute certificate (e.g., an X.509 attribute certificate) signed by the manufacturer of the KRD. The attribute certificate contains metadata about the KDH, the KRD, and the X.509 public key certificates of the KDH and the KRD, to establish a secure binding that both the KDH and the KRD can verify and trust. The trust relationship between a KDH and multiple KRDs is enabled using a KRD whitelist, signed by the KRD manufacturer (manufacturer of the KRD). The KRD whitelist is composed of the KRD certificates and other KRD metadata, such as the KRD Machine Address Code (MAC), its hardware serial number, and so on. The KRD certificates in a KRD whitelist include certificates (e.g., attribute certificates) for one or more KRDs, where each KRD can have one or more attribute certificates. The KRD metadata in the KRD whitelist includes the metadata for one or more KRDs. In some arrangements, the KDH can supplement the KRD whitelist with additional information such as the KRD location, Internet Protocol (IP) address, and the like.

Figure 1:
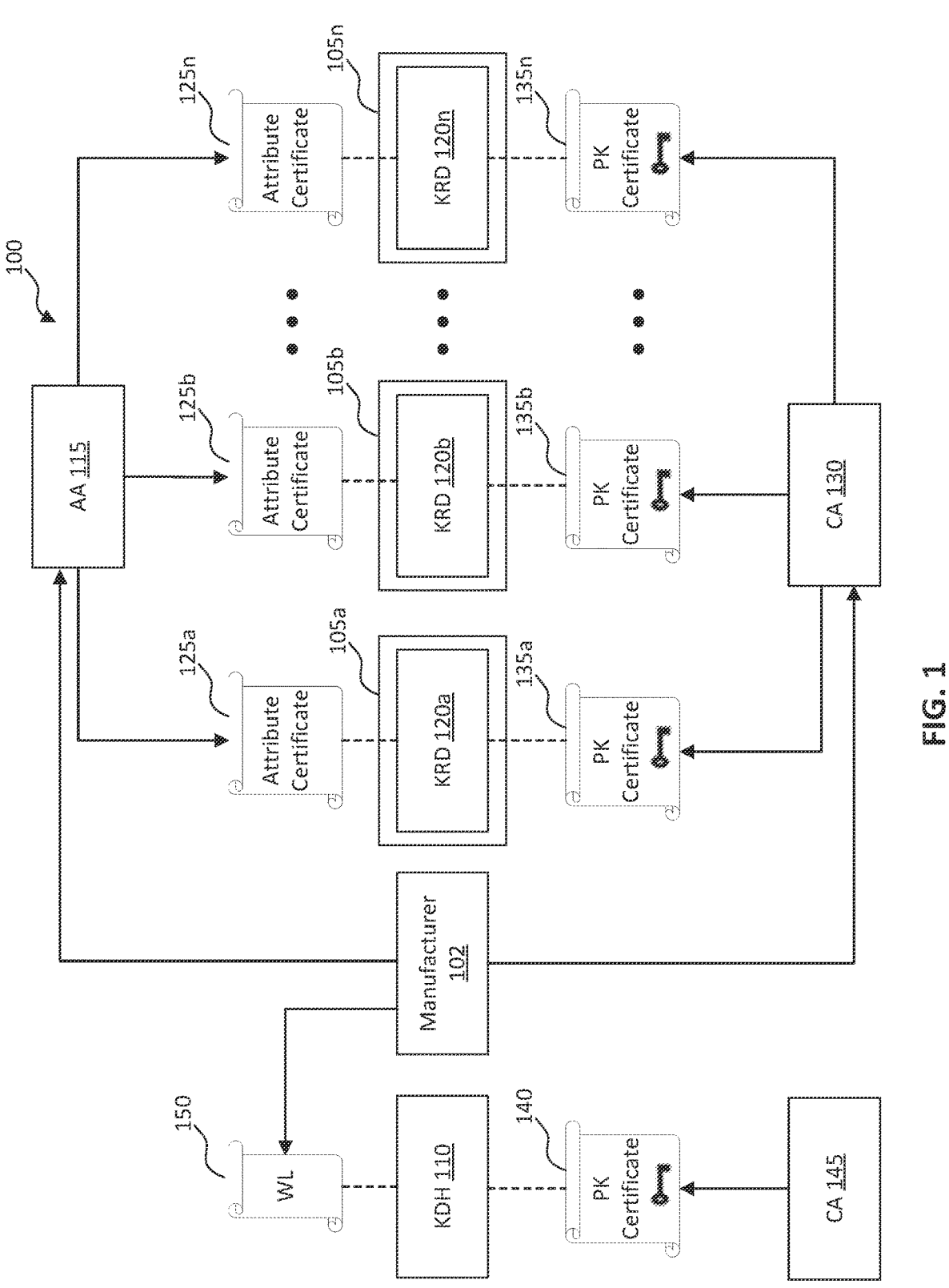
FIG. 1 is a diagram illustrating a system for key distribution between a KDH and multiple KRDs, according to various arrangements.

FIG. 1 is a diagram illustrating a system 100 for key distribution between a KDH 110 and multiple KRDs 120*a*, 120*b*, . . . , 120*n*, according to various arrangements. Symmetric keys from the KDH 110 can be distributed to the multiple KRDs 120*a*, 120*b*, . . . , 120*n* using asymmetric cryptography. Each of the KRDs 120*a*, 120*b*, . . . , 120*n* is (or contains) a cryptographic hardware module such as Personal Identification Number (PIN) Encrypting Device (PED), Encryption PIN Pad (EPP), a Host Security Module (HSM), or so on, in some examples. Each of the KRDs 120*a*, 120*b*, . . . , 120*n* can be incorporated into a device, server, or system, such as a respective one of the devices 105*a*, 105*b*, . . . , 105*n*. Each of the devices 105*a*, 105*b*, . . . , 105*n* can be an Automatic Teller Machine (ATM), Point of Sale (POS) device, smartphone, mobile phone, laptop, desktop, workstation, tablet, a server, computers, datacenters, and so on. Each of the devices 105*a*, 105*b*, . . . , 105*n* can include suitable processing capabilities (e.g., a processing circuit including a processor and a memory) for performing operations described herein, including executing applications, programs, and software that can use symmetric keys that a respective one of the KRDs 120*a*, 120*b*, . . . , 120*n* receive from the KDH 110. In some examples, a KRD can refer to any hardware, firmware, and/or software used to perform cryptographic functions for a device on which it is incorporated or installed. The KDH 110 is a device, server, or system that can manage key distribution to the KRDs 120*a*, 120*b*, . . . , 120*n* in the manner described.

The Attribute Authority (AA) 115 is a device, server, or system that can issue attribute certificates, such as the attribute certificates 125*a*, 125*b*, . . . , 125*n* (e.g., KRD attribute certificate), for respective ones of the KRDs 120*a*, 120*b*, . . . , 120*n*. The AA 115 can include suitable processing capabilities (e.g., a processing circuit including a processor and a memory) for performing operations described herein, including issuing and providing the attribute certificates 125*a*, 125*b*, . . . , 125*n*. Although each of the KRDs 120*a*, 120*b*, . . . , 120*n* is shown to have a corresponding one of the attribute certificates 125*a*, 125*b*, . . . , 125*n* issued thereto, each KRD can have two or more attribute certificates issued thereto.

The Certificate Authority (CA) 130 is a device, server, or system that can issue public key certificates, such as the public key certificates 135*a*, 135*b*, . . . , 135*n* (e.g., KRD public key certificate), for respective ones of the KRDs 120*a*, 120*b*, . . . , 120*n*. The CA 130 can include suitable processing capabilities (e.g., a processing circuit including a processor and a memory) for performing operations described herein, including issuing and providing the public key certificates 135*a*, 135*b*, . . . , 135*n*. Although each of the KRDs 120*a*, 120*b*, . . . , 120*n* is shown to have a corresponding one of the public key certificates 135*a*, 135*b*, . . . , 135*n* issued thereto, each KRD can have two or more public key certificates issued thereto.

The CA 145 is a device, server, or system that can issue public key certificates, such as the public key certificate 140 for the KDH 130. The CA 145 can include suitable processing capabilities (e.g., a processing circuit including a processor and a memory) for performing operations described herein, including issuing and providing the public key certificate 140. In some examples, the CA 130 and the CA 145 can be different CAs operating in different PKI domains. Given that binding is executing using the attribute certificates 125*a*, 125*b*, . . . , 125*n* and the whitelist 150, the CAs for the KDH 110 and for the KRDs 120*a*, 120*b*, . . . , 120*n* do not need to be in the same PKI domain. In some examples, the CA 130 and the CA 145 can be a same CA operating in a given PKI domain, and the AA 115 is a different authority operating in a different PKI domain. In some examples, the AA 115 and the CA 130 are from a same PKI domain, which is that associated with a manufacturer of the KRDs 120*a*, 120*b*, . . . , 120*n*. At least one private signature key of each of the AA 115, the CA 130, and the CA 145 can be stored in a Hardware Security Module (HSM) or in a removable media (e.g., a Universal Serial Bus (USB)), where the private signature key is protected (e.g., password-based protection).

The manufacturer 102 can include a computing system, device, or server that can request the AA 115 to issue the attribute certificates 125*a*, 125*b*, . . . , 125*n* and request the CA 130 to issue the public key certificates 135*a*, 135*b*, . . . , 135*n* for respective ones of the KRDs 120*a*, 120*b*, . . . , 120*n*. The manufacturer 102 can include one or more manufacturers of the KRDs 120*a*, 120*b*, . . . , 120*n*. While the manufacturer 102 is described herein as the entity managing the binding the KRDs 120*a*, 120*b*, . . . , 120*n* to the KDH 110, unbinding a KRD to the KDH 110, or rebinding a KRD to another KDH 110, the manufacturer 102 can include any manager, service, or maintenance entity that can execute one or more of such functions.

With respect to symmetric key distribution, each of the KRDs 120*a*, 120*b*, . . . , 120*n* is provided an asymmetric private key (e.g., an Rivest-Shamir-Adleman (RSA)). A corresponding public key certificate (e.g., a respective one of the public key certificates 135*a*, 135*b*, . . . , 135*n*) can be provided by the manufacturer 102 (e.g., via the CA 130) to each of the KRDs 120*a*, 120*b*, . . . , 120*n*. The public key certificates 135*a*, 135*b*, . . . , 135*n* can be used by the KDH 110 to encrypt symmetric keys which are then provided to the KRDs 120*a*, 120*b*, . . . , 120*n*, for each of the KRDs 120*a*, 120*b*, . . . , 120*n* to decrypt using its private key and to install the symmetric keys. In some examples, each of the KRDs 120*a*, 120*b*, . . . , 120*n* can send its public key certificate (a respective one of the 135*a*, 135*b*, . . . , 135*n*) to the KDH 110. The KDH 110 can verify the public key certificate using the signature of the CA 130 (e.g., using certificate chain validation involving a certificate chain having a root certificate, intermediate certificate, and the CA certificate). In some examples, the manufacturer 102 can provide the public key certificates 135*a*, 135*b*, . . . , 135*n* to the KDH 110 according to the whitelist 150. The KDH 110 is provided an asymmetric private key (e.g., an RSA) and the corresponding public key certificate 140 by the same manufacturer 102 (e.g., via the CA 145). In some examples, the KDH 110 generates a key pair to submit a Certificate Signing Request (CSR) (e.g., RFC 2986 PKCS #10 Certification Request Syntax Specification Version 1.7) to the CA 145, which provides the public key certificate 140 to the KDH 110 in response to the CSR. In some examples, the manufacturer 102 provisions a public and private key pair for the KDH 110, submits a CSR to the CA 145 or the CA 130, and the CA 145 or 130 provides the public key certificate 140 to the KDH 110 in response to the CSR. The KDH 110 can use its private key to sign the encrypted symmetric key provided to each of the KRDs 120*a*, 120*b*, . . . , 120*n*, and each of the KRDs 120*a*, 120*b*, . . . , 120*n* can verify the KDH's signature on the encrypted symmetric keys using the KDH's public key certificate 140. The public key certificate 140 includes a first type of public key certificate used to verify the KDH signature on the signed encrypted keys and a second type of public key certificate used to establish encryption keys with the KRDs.

For instance, the KDH 110 can use the public key of the KRD 120a included in the public key certificate 135a to encrypt or establish a symmetric key. The KDH 110 can use its own private key to sign the encrypted symmetric key. The encrypted and signed symmetric key is provided or distributed to the KRD 120a by the KDH 110 via a physical connection (e.g., cable) or a wireless/wired network. In some examples, the symmetric key is encrypted and signed (or signed and encrypted) via signcryption via a single API call to avoid various attacks. The KRD 120a receives the encrypted and signed (or signcrypted) symmetric key and verifies the signature using the public key of the KDH 110 included in the public key certificate 140. In some examples, TR-34 signs a key loading command message that contains the encrypted symmetric keys. In TR-34, a key token generated by the KDH 110 is used to transport the symmetric key. A data block contains a random number, a key block header, and an enciphered key block. The KDH 110 signs the block using its private signing key. The KDH 110 appends a valid CRLCA_KDH to the block and creates the key token. This key token is encapsulated.

Upon verification, the KRD 120a decrypts the encrypted symmetric key using the asymmetric private key (e.g., the RSA asymmetric private key) of the KRD 120a and installs the symmetric key to the KRD 120a and/or the device 105a. The symmetric key can be used in the operations or communications of the device 105a. The public key certificates 135b, . . . , 135n and the public key certificate 140 can be likewise used to install symmetric keys on the KRDs 120b, . . . , 120n. Prior to deployment, the KRDs 120a, 120b, . . . , 120n are typically stored in inventory, unaware of the identity of the KDH 110. The symmetric key distribution can be performed in response to establish trust relationship using the attribute certificates 125a, 125b, . . . , 125n and the whitelist 150 as described herein. A KRD (e.g., ATM, POS, and so on) becomes online after successfully installing the symmetric key. The manufacturer 102, the CA 130, the AA 115 do not provide an online CRL or OCSP service, so the certificate revocation status may not be checked or is very old at best. In some examples, a KRD can perform certificate validation using CRL or OCSP either per the manufacturer, or the KDH 110 who can check CRL or OCSP services.

The KRDs 120a, 120b, . . . , 120n are initially delivered from the manufacturer 102 in an unbound state. That is, the KRDs 120a, 120b, . . . , 120n can engage in keying with any authorized KDH upon being initially delivered. After the KRDs 120a, 120b, . . . , 120n and the KDH 110 have exchanged credentials, the KRDs 120a, 120b, . . . , 120n are bound to that KDH 110. In some example, the KRDs 120a, 120b, . . . , 120n can ignore keying attempts from another KDH until the KRDs 120a, 120b, . . . , 120n are unbound from the KDH 110 or rebound with the another KDH. Rebinding is a trusted introduction of the new KDH by the current KDH. This prevents a KRD from entering an unbound state and being vulnerable to a malicious take over. There are typically four unbind and rebind scenarios: (1) a physical reset of the KRD, (2) an unbind command is sent from the current KDH, (3) a rebind command is sent from the new KDH, and (4) a rebind command is sent from a manufacturer KDH.

A public key certificate (e.g., the public key certificates 135a, 135b, . . . , 135n) contains a public key (e.g., a name public key, a subject public key, and so on) and is a signed object including basic fields and extensions. For example, ITU-T X.509 defines a structure and content for public key certificates, an example of which is shown in FIG. 2. The public key certificate shown in the table in FIG. 2 includes various fields including at least a certificate version, a certificate serial number, a certificate signature algorithm, an issuer name, validity dates, subject name, subject public key, extensions, and certificate signature.

The certificate version field of the public key certificate defines a version of the public key certificate, e.g., v3. The certificate serial number field of the public key certificate includes an unique number relative to the CA 130 that issues the public key certificate. The certificate signature algorithm field of the public key certificate identifies the signature and hash algorithm used to sign the public key certificate. The issuer name field of the public key certificate identifies the name of the CA 130 that issued the public key certificate. The validity dates field of the public key certificate includes a not-before date before which the public key certificate is invalid and a not-after date (e.g., expiration date) after which the public key certificate is invalid. In some examples, the expiration date can include a date and time e.g., YYYMMDD-HHMMSS. In some examples, a not-before is the issuance date of the certificate. The subject name field of the public key certificate identifies the name of the owner of the public key included in the public key certificate. The subject public key field of the public key certificate includes the actual public key (e.g. hexadecimal digits) and information about the public key associated with the subject. The extensions of the public key certificate typically include one or more various extensions providing additional information about the subject, the issuer, the public key, etc. The certificate signature field of the public key certificate includes the digital signature generated by the issuer CA 130 over all the other fields and extensions of the public key certificate. In some examples, the extensions field of the public key certificate includes a basic constraint extension, which identifies that the public key certificate is an CA certificate (e.g., a certificate issued by one CA to another CA) or a subject certificate (e.g., a certificate issued by a CA to the subject identified in the subject name field).

FIG. 3 is a table illustrating the three subfields of each extension of the public key certificate, according to various arrangements (X.509). As shown, each extension includes three subfields: the extension Identifier (ID), extension critical flag, and extension value. The extension ID subfield is an Object Identifier (OID) that defines a type of the extension. The extension critical flag subfield is a Boolean value indicating whether the extension is critical (true) or non-critical (false). The extension value subfield includes a format and content of the extension, depending on the OID. Extensions marked to be critical in the extension critical flag subfield has to be processed. For example, in response to determining that the OID is unknown or unsupported, the certificate cannot be used. Accordingly, certificate validation immediately fails in response to determining that the extension is critical (per the extension critical flag subfield) and that the OID is unknown. On the other hand, in response to determining that the extension is non-critical (per the extension critical flag subfield) and that the OID is unknown or unsupported, the extension can be ignored and certificate validation can proceed as normal, and in some cases with a warning. The extensions can include standardized extensions (e.g., X.509, RFC 5280), as well as proprietary extensions used by the CA (the issuer) and/or the certificate subject.

An attribute certificate (e.g., the attribute certificates 125a, 125b, . . . , 125n) of a KRD contains information or metadata associated with the subject, a public key or a public key certificate (e.g., the public key certificates 135*a*, 135*b*, . . . , 135*n*) of the KRD. An attribute certificate contains the public key information, without containing the public key information itself. The attribute certificate is a signed object including basic fields and extensions. For example, ITU-T X.509 defines a structure and content for attribute certificates, an example of which is shown in the table in FIG. 4. The attribute certificate shown in FIG. 4 includes various fields including at least a certificate version, a holder identifier, an issuer name (e.g., the AA 115), a certificate signature algorithm, a certificate serial number, validity dates, attributes, extensions, and certificate signature.

The certificate version field of the attribute certificate defines a version of the attribute certificate, e.g., v2. The holder identifier field of the attribute certificate identifies an owner of the attribute certificate, which can be the same as the owner identified by the subject name. The issuer name field identifies the name of the AA 115 that issues the attribute certificate. The certificate signature algorithm field identifies the signature and/or hash algorithm used to sign the attribute certificate by the AA 115. The certificate serial number field of the attribute certificate comprises an unique number relative to the AA 115 that issues the attribute certificate. The validity dates field of the attribute certificate includes a not-before date (e.g., issuance date) before which the attribute certificate is invalid and a not-after date (e.g., expiration date) after which the attribute certificate is invalid. The attributes field of the attribute certificate includes the information about the attributes associated with the public key or the public key certificate as well as information about the binding to the KDH 110. The extensions field of the attribute certificate include various types of extensions for the attribute certificate, with subfields such as those shown in FIG. 3. The certificate signature field of the attribute certificate includes the signature of the AA 115 over the other fields of the attributes certificate.

FIG. 5 is a table illustrating subfields of each attributes field of the attribute certificate, according to various arrangements. As shown, each attributes field includes subfields such as type ID and attribute values. The type ID subfield include an OID that defines type of the attribute. The attribute values subfield includes a format and content of the attribute, depending on the OID.

In some examples, the attribute certificate can include a reference or an ID (e.g., the certificate serial number) of the associated public key certificate in the attributes field. For example, the attributes field of the attribute certificate 125*a* can include an attribute identified by the type ID indicating 1) a public key certificate type, and 2) one or more values indicating an ID (e.g., the certificate serial number) of the public key certificate 135*a*. In some examples, the attribute certificate can include a reference or an ID of the KDH 110 in the attributes field. For example, the attributes field of the attribute certificate 125*a* can include an attribute identified by the type ID indicating a KDH type and one or more values indicating an ID (e.g., Machine Address Code (MAC), a hardware serial number, a network address (e.g., IP address), a location of the KDH 110, or another suitable ID) of the of the KDH 110. In some examples, an attribute certificate can contain a Subject Key Identifier (SKI) extension of the public key contained in the associated public key certificate.

Accordingly, the public key certificates 135*a*, 135*b*, . . . , 135*n* are used to manage the public keys of the KRDs 120*a*, 120*b*, and 120*n* while the attribute certificates 125*a*,

125*b*, . . . , 125*n* are used to manage the attributes associated with those public key, where such attributes includes the binding information indicating that the KRDs 120*a*, 120*b*, and 120*n* are bound to the KDH 110. Thus, the public key and its associated information or metadata are separately managed, in case the attributes may change more frequently than the public key or the public key certificate. For example, the binding, unbinding, and rebinding of a KRD with a KDH can change the attributes specified by the attribute certificates 125*a*, 125*b*, . . . , 125*n*.

In some examples, the AA 115 and CA 130 are managed (owned and/or operated) by the KRD manufacturer 102 or an authorized agent of the manufacture 102. In some examples, the AA 115 and CA 130 are managed (owned and/or operated) by two separate entities, one of which can be the KRD manufacturer 102 or an authorized agent of the manufacture 102, and another one of the two separate entities can be another computing system not associated with the manufacturer 102. In some examples, the CA 130 and the AA 115 can be the same entity or a same computing system. In some examples, the CA 130 and the AA 115 can be equivalent to each other. In some examples, the CA 130 issuing the public key certificate and the AA 115 issuing the attribute certificate are different entities or different computing systems. In some examples, the AA 115 can be a subgroup of the CA 130. For example, two devices associated with different entities and different AAs can obtain their respective public key certificates from the same CA (and signed by the same CA), and can obtain their respective attribute certificates from the different AAs (and respectively signed by the different AAs). Similarly, the CA 130 and CA 145 might be the same entity or a some computing system, possibly with different root CA, or different issuing CA with the same root CA. Note that the PKI hierarchy (e.g. root CA, issuing CA) is wholly dependent on the deployment and instantiation of the overall implementation.

In some arrangements, the system in FIG. 1 enables each KRD 120*a*, 120*b*, . . . , 120*n* to have knowledge of its authorized KDH, including the KDH 110, and enables the KDH 110 to have knowledge of all associated KRDs 120*a*, 120*b*, . . . , 120*n* using the whitelist 150. In some examples, two or more KDHs can manage a given KRD, and the system in FIG. 1 is likewise applicable. For example, in BC/DR and regionalization scenarios, an ATM fleet can have tens of thousands of ATM units, while a POS fleet can have hundreds of thousands of POS units. Other devices (e.g. mobile phones) may have tens of millions of devices in a fleet. In such examples, multiple KDHs can manage one of the many KRDs. Each KDH may have knowledge of at least one other KDH that manage a same KRD or a different KRD.

For example, in response to multiples KRDs 120*a*, 120*b*, . . . , 120*n* being assigned and deployed to the specific KDH 110, the manufacturer 102 generates (e.g., via the AA 115) the attribute certificates 125*a*, 125*b*, . . . , 125*n* (e.g., X.509 attribute certificates) for the respective KRDs 120*a*, 120*b*, . . . , 120*n* and injects those attribute certificates 125*a*, 125*b*, . . . , 125*n* into the KRDs 120*a*, 120*b*, . . . , 120*n*. The manufacturer 102 can generate and inject the attribute certificates 125*a*, 125*b*, . . . , 125*n* before or after the KRDs 120*a*, 120*b*, . . . , 120*n* are shipped and installed at a location of the KDH 110. The KRDs 120*a*, 120*b*, . . . , 120*n* can validate the attribute certificates 125*a*, 125*b*, . . . , 125*n* using the certificate signature of the AA 115, included in the certificate signature fields of the attribute certificates 125*a*, 125*b*, . . . , 125*n*. This binds the KDH to the KRD for exchanging subsequent messages in cryptographic processes (e.g., key distribution messages). The attribute certificates 125a, 125b, . . . , 125n indicate that the respective KRDs 120a, 120b, . . . , 120n are bound to the KDH 110. As described, the attributes field of each of the attribute certificates 125a, 125b, . . . , 125n includes a value corresponding to an ID the KDH 110. The ID can include a MAC of the KDH 110, a hardware serial number of the KDH 110, a network address of the KDH 110, a location of the KDH 110, or another suitable ID of the KDH 110.

For example, in response to the KRD 120a being assigned and deployed to the specific KDH 110, the manufacturer 102 generates (e.g., via the AA 115) the attribute certificate 125a (e.g., X.509 attribute certificates) for the KRD 120a and injects the attribute certificate 125a into the KRD 120a. The injection can be performed via a physical connection (e.g., via a physical cable or wired network) in some examples, and in other examples, via a wireless network. The manufacturer 102 can generate and inject the attribute certificate 125a before or after the KRD 120a is shipped and installed at a location of the KDH 110. The KRD 120a can validate the attribute certificate 125a using the certificate signature of the AA 115 and certificate validation at a trusted root AA (e.g., using certificate chain validation involving a certificate chain having a root certificate, intermediate certificate, and the AA certificate). In some examples, the manufacturer 102 signs the attribute certificate 125a, and the KRD 120a can verify the signature of the manufacturer 102. The attribute certificate 125a (e.g., the attributes field) includes a value corresponding to the ID of the KDH 110. The manufacturer 102 can generate and inject the attribute certificates 125b, . . . , 125n for the KRDs 120b, . . . , 120n in the same manner.

In some arrangements, in response to multiple KRDs 120a, 120b, . . . , 120n being assigned and deployed to a specific KDH, the manufacturer 102 generates the whitelist 150 that provides an inventory of the KRDs 120a, 120b, . . . , 120n. The whitelist 150 includes a list or set of the attribute certificates 125a, 125b, . . . , 125n generated by the AA 115, thus the attribute certificates 125a, 125b, . . . , 125n can be reused to conserve implementation cost. In some arrangements, the AA 115 can send the attribute certificates 125a, 125b, . . . , 125n to the manufacturer 102 via a suitable network in response to generating the attribute certificates 125a, 125b, . . . , 125n, and the manufacturer 102 can send the attribute certificates 125a, 125b, . . . , 125n as part of the whitelist 150 to the KDH 110. The AA 115 can send the attribute certificates 125a, 125b, . . . , 125n to the KDH 110 via a suitable network in response to generating the attribute certificates 125a, 125b, . . . , 125n, in some arrangements.

In some examples, an attribute certificate can identify multiple KDHs to which the KRD is bound. For example, the attributes field of the attribute certificate 125a includes a value corresponding to the ID of the KDH 110 and another value corresponding to an ID of another KDH 110.

The manufacturer 102 can add a KRD to the whitelist 150, delete a KRD from the whitelist 150, and modify a KRD in the whitelist 150 as needed. Correspondingly, the manufacturer 102 can issue or revoke attribute certificates as needed. Revocation occurs when the attribute certificate usage period terminates before its validity not-after (e.g., expiration) date. This enables an inventory management scheme between the KDH 110 and the manufacturer 102.

Figures 6, 7, 8, 9, 10:
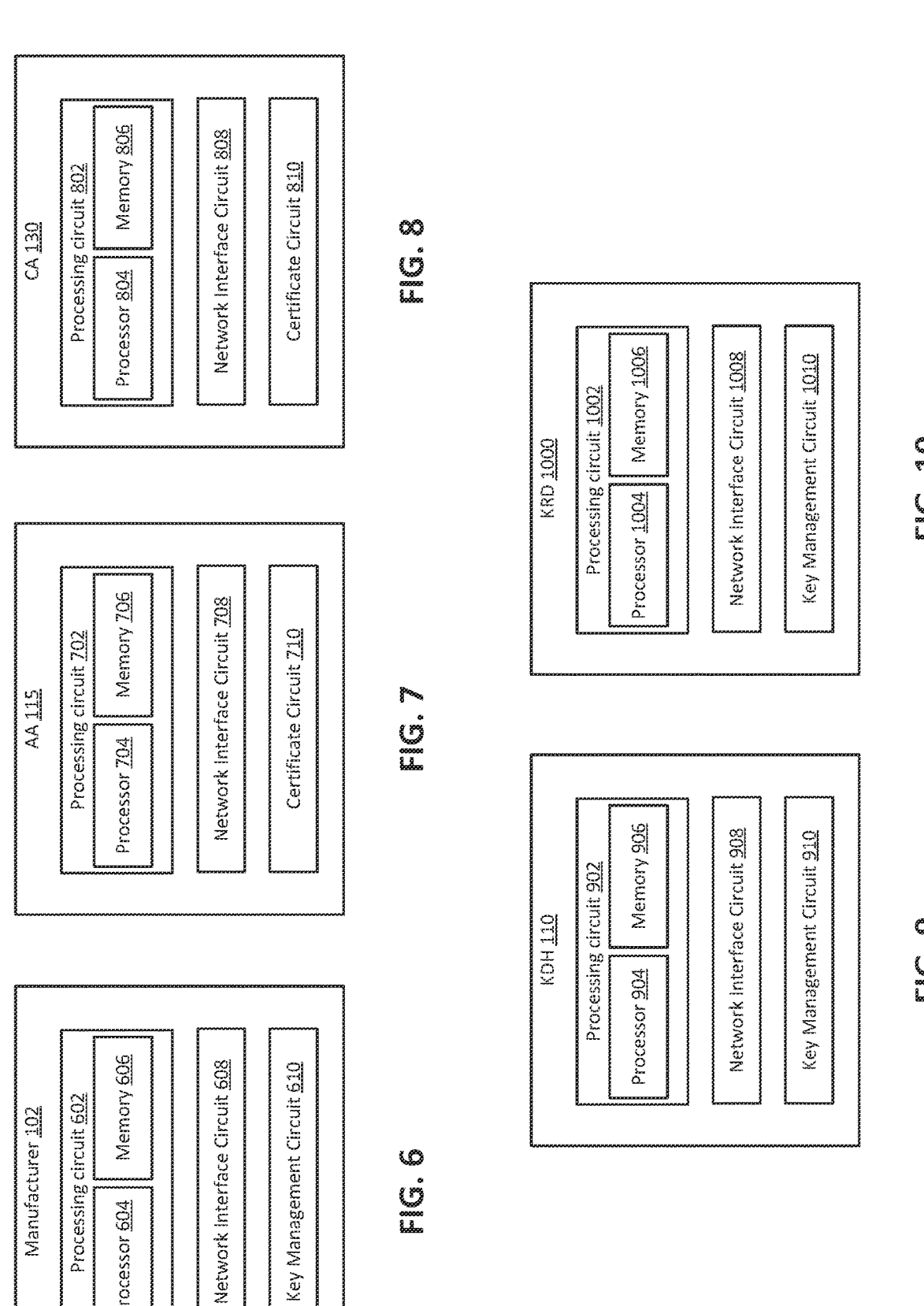
FIG. 6 is a block diagram illustrating an example manufacturer, according to various arrangements.
FIG. 7 is a block diagram illustrating an example Attribute Authority (AA), according to various arrangements.
FIG. 8 is a block diagram illustrating an example CA, according to various arrangements.
FIG. 9 is a block diagram illustrating an example KDH, according to various arrangements.
FIG. 10 is a block diagram illustrating an example KRD, according to various arrangements.

FIG. 6 is a block diagram illustrating an example of the manufacturer 102, according to various arrangements. FIG. 7 is a block diagram illustrating an example of the AA 115, according to various arrangements. FIG. 8 is a block diagram illustrating an example of the CA 130, according to various arrangements. FIG. 9 is a block diagram illustrating an example of the KDH 110, according to various arrangements. FIG. 10 is a block diagram illustrating an example KRD 1000 (e.g., the KRDs 120a, 120b, . . . , 120n), according to various arrangements.

Each of the manufacturer 102, the AA 115, the CA 130, the KDH 110, and the KRD 1000 includes a processing circuit (e.g., 602, 702, 802, 902, 1002) having a processor (e.g., 604, 704, 804, 904, 1004) and a memory (e.g., 606, 706, 806, 906, 1006). The processor described herein is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory described herein (e.g., Random Access Memory (RAM), Read-Only Memory (ROM), Non-Volatile RAM (NVRAM), Flash Memory, hard disk storage, etc.) stores data and/or computer code for facilitating the various processes described herein. Moreover, the memory is or includes tangible, non-transient volatile memory or non-volatile memory. Accordingly, the memory includes database components, object code components, script components, or any other type of information structure for supporting the various activities and information structures described herein. The processing circuit described herein can be used to implemented one or more of the circuits of the manufacturer 102, the AA 115, the CA 130, the KDH 110, and the KRD 1000 and execute one or more software or applications on the manufacturer 102, the AA 115, the CA 130, the KDH 110, and the KRD 1000.

Each of the manufacturer 102, the AA 115, the CA 130, the KDH 110, and the KRD 1000 includes a network interface circuit (e.g., 608, 708, 808, 908, 1008) configured for and structured to establish a connection and communicate with each other via a network. The network interface circuit is structured for sending and receiving data over a communication network (Accordingly, the network interface circuit includes any of a cellular transceiver (for cellular standards), wireless network transceiver (for 802.11X, ZigBee, Bluetooth, Wi-Fi, or the like), wired network interface, or a combination thereof. For example, the network interface circuit may include wireless or wired network modems, ports, baseband processors, and associated software and firmware.

The network can include any suitable Local Area Network (LAN), Wide Area Network (WAN), or a combination thereof. For example, the network 105 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The network is structured to permit the exchange of data, values, instructions, messages, and the like.

In the examples the KRD 1000 operates locally can cannot access online revocation services, the network interface circuit 1008 includes hardware (e.g., a physical connection like a cable or a connection), firmware and/or software configured to receive physical injection of the attribute certificates 125a, 125b, . . . , or 125n from the manufacturer 102 or the KDH 110.

The manufacturer 102 includes a key management circuit 610 configured to perform the operations herein relating to managing keys, including obtaining the attribute certificates 125a, 125b, . . . , 125n from the AA 115, providing (e.g., injecting) the attribute certificates 125a, 125b, . . . , 125n into the KRD 120a, 120b, . . . , 120n, obtaining the public key certificates 135a, 135b, . . . , 135n from the CA 130, providing (e.g., injecting) the public key certificates 135a, 135b, . . . , 135n into the KRD 120a, 120b, . . . , 120n, generating the whitelist 150, and adding a KRD to the whitelist 150, deleting a KRD from the whitelist 150, and modifying a KRD in the whitelist 150.

The AA 115 includes a certificate circuit 710 configured to generate the attribute certificates 125a, 125b, . . . , 125n at the request of the manufacturer 102 and provide the attribute certificates 125a, 125b, . . . , 125n to the manufacturer 102 to be injected into the KRD 120a, 120b, . . . 120n. The CA 130 includes a certificate circuit 810 configured to generate the public key certificates 135a, 135b, . . . , 135n at the request of the manufacturer 102 and provide the public key certificates 135a, 135b, . . . , 135n to the manufacturer 102 to be injected into the KRD 120a, 120b, . . . , 120n.

The KDH 110 includes a key management circuit 910 configured to provide signed, encrypted symmetric keys to the KRDs 120a, 120b, . . . , 120n in the manner described. For example, the key management circuit 910 can provide the signed, encrypted symmetric keys to the KRDs in the WL 150.

The KRD 1000 includes a key management circuit 1010 configured to receive the attribute certificate and the public key certificate, any modifications thereof, and so on via the network interface circuit 1008. The key management circuit 1010 can receive the signed, encrypted symmetric key from the KDH 110 via the network interface circuit 1008.

Figure 11:
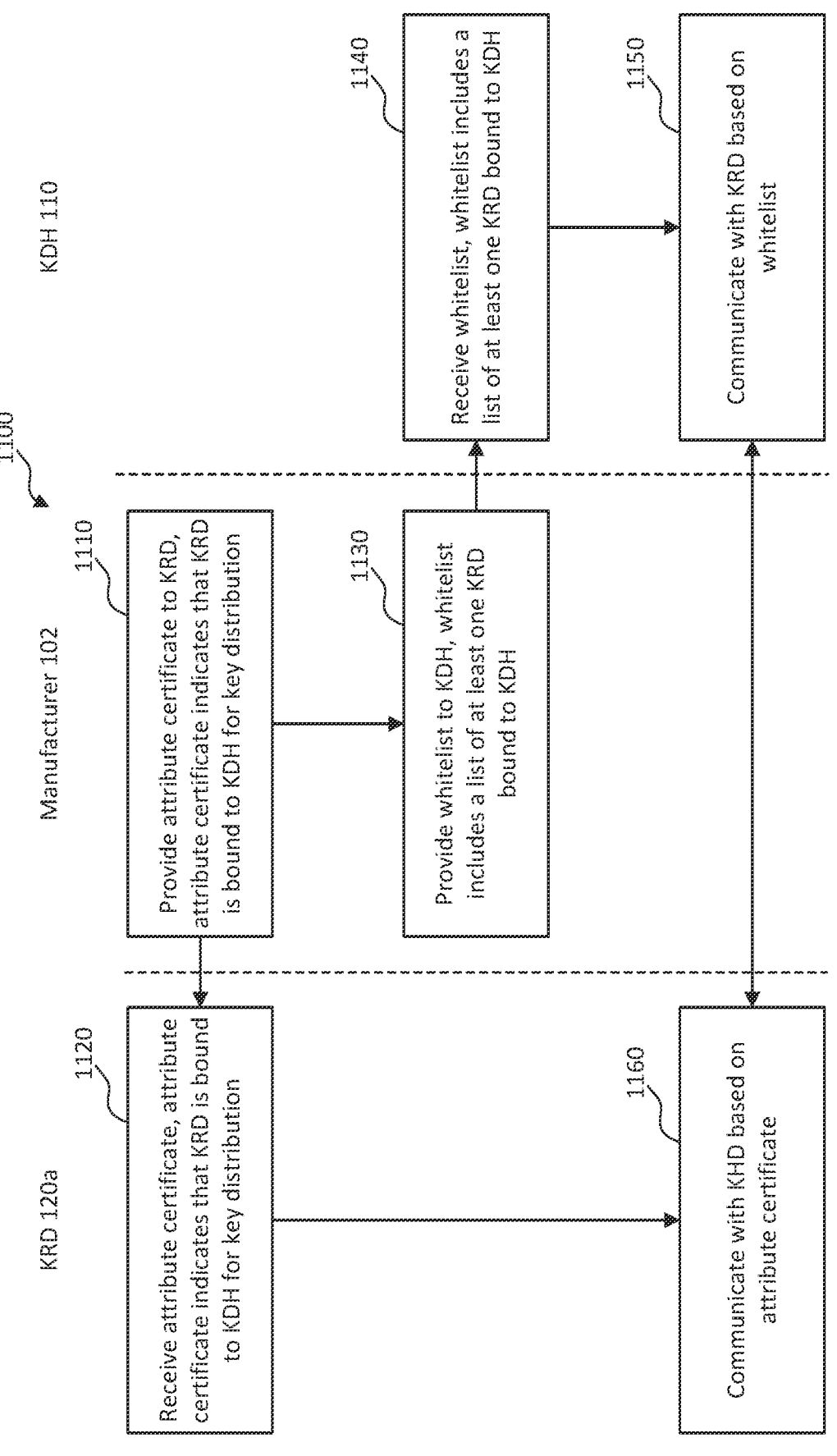
FIG. 11 is a flowchart diagram illustrating a key management method, according to some arrangements.

FIG. 11 is a flowchart diagram illustrating a key management method 1100, according to some arrangements. The method 1100 can be performed using the system 100. The dashed lines in FIG. 11 represent network (wireless or wired) or physical connection (e.g., cable) across which information and data can be communicated. The method 1100 use attribute certificates to bind the KDH 110 to the KRD 120a to establish symmetric keys, establish Transport Layer Security (TLS) using Pre-Shared Keys (PSK) methods, Secure Shell (SSH), Internet Protocol Security (IPsec), and so on.

At 1110, the manufacturer 102 provides an attribute certificate (e.g., the attribute certificate 125a) to the KRD 120a. The attribute certificate (e.g., the attribute certificates 125a) indicates that the KRD 120a is bound to the KDH 110. For example, the attribute certificate 125a in the attributes field can include a value corresponding to an ID the KDH 110. The ID can include a MAC of the KDH 110, a hardware serial number of the KDH 110, a network address of the KDH 110, a location or the KDH 110, or another suitable ID of the KDH 110. The KRD 120a can validate the attribute certificate 125a using the certificate signature of the AA 115, included in the certificate signature fields of the attribute certificate 125a. The manufacturer 102 can request that the AA 115 provide the attribute certificate 125a. The AA 115 can provide the attribute certificate 125a to the manufacturer 102, which then injects the attribute certificate 125a into the KRD 120a. At 1120, the KRD 120a receives the attribute certificate. The manufacturer 102 injects the attribute certificate 125a into the KRD 120a via a physical connection (e.g., via a physical cable or wired network) in some examples, and in other examples, via a wireless network.

At 1130, the manufacturer 102 provides the whitelist 150 to the KDH 110. The whitelist 150 includes a list of at least one KRD bound to the KDH 110. The manufacturer 102 generates the whitelist 150 that provides an inventory of the KRDs 120a, 120b, . . . , 120n. The whitelist 150 includes a list or set of the attribute certificates 125a, 125b, . . . , 125n generated by the AA 115, the MAC of each of the KRDs 120a, 120b, . . . , 120n, the hardware serial number of each of the KRDs 120a, 120b, . . . , 120n, a network address (e.g., an IP address) of each of the KRDs 120a, 120b, . . . , 120n, a location (e.g., map coordinates, location identifiers, Global Positioning Service (GPS) coordinates, and so on) of each of the KRDs 120a, 120b, . . . 120n, and so on. In some examples, the manufacturer 102 signs the whitelist 150 using a digital signature of the manufacturer 102 and sends the whitelist 150 to the KDH 110 via a network. The KDH 110 can validate the whitelist 150 using the signature (e.g., the digital signature) of the manufacturer 102 and a certificate (e.g., an X.509 certificate) of the manufacturer 102 issued from a trusted CA (e.g., the CA 130 or another suitable CA). The KDH 110 can validate the attribute certificates 125a, 125b, . . . , 125n using the certificate signature of the AA 115, included in the certificate signature fields of the attribute certificates 125a, 125b, . . . , 125n. At 1140, the KDH 110 receives the whitelist 150. The KDH 110 can verify the whitelist 150 using a public key certificate of the manufacturer 102, for example, by using a public key included in that public key certificate.

In some arrangements, in response to receiving the whitelist 150 (e.g., at 1140) or in response to receiving the updated whitelist (e.g., at 1220, 1320, 1420), the KDH 110 can add additional information to the whitelist 150. For example, the KDH 110 can add a network address (e.g., an IP address) of each of the KRDs included in the whitelist, a location (e.g., map coordinates, location identifiers (e.g., physical addresses), GPS coordinates, and so on) of each of the KRDs included in the whitelist, phone numbers of each of the KRDs included in the whitelist and so on. The KDH 110 can add information to the whitelist without modifying the portion of the whitelist that is signed by the manufacturer 102 using the signature of the manufacturer 102, to avoid negating the signature of the manufacturer 102 thus nullifying the integrity and authenticity of the whitelist. In some examples, in response to the KDH 110 verifying the whitelist 150 or the updated whitelist using the signature of the manufacturer 102, the KDH 110 can copy the information included in the received whitelist into an internal database. The KDH 110 can add the additional information into the database, instead of on the whitelist itself.

The KRD 120a and the KDH 110 can communicate with each other based on the attribute certificate and the whitelist 150. The message, data, or information communicated between the KRD 120a and the KDH 110 can include messages in cryptographic processes such as messages for key distribution, TLS using PSK, SSH, IPsec, and so on.

For example, at 1150 the KDH 110 can communicate with the KRD 120a based on the whitelist 150. The KDH 110 can send message, data, or information to the KRD 120a and receive message, data, or information from the KRD 120a in response to one or more of: 1) validating the whitelist 150 and determining that the KRD 120a is included in the whitelist 150; or 2) validating the attribute certificate 125a (having a holder identifier corresponding to the KRD 120a)

in the whitelist 150. The KDH 110 can determine that the KRD 120*a* is included in the whitelist 150 by determining one or more of the MAC of the KRD 120*a* is included in the whitelist 150, the hardware serial number of the KRD 120*a* is included in the whitelist 150, a network address (e.g., an IP address) of the KRD 120*a*, a location (e.g., map coordinates, location identifiers, GPS coordinates, and so on) of the KRD 120*a*, another ID of the KRD 120*a* is included in the whitelist 150, the attribute certificate 125*a* having a holder identifier corresponding to the KRD 120*a* is included in the whitelist 150, and so on. For example, the KDH 110 can send one or more signed, encrypted symmetric key(s) to the KRD 120*a* in response to one or more of: 1) validating the whitelist 150 and determining that the KRD 120*a* is included in the whitelist 150; or 2) validating the attribute certificate 125*a* in the whitelist 150.

At 1160, the KRD 120*a* can communicate with the KDH 110 based on the attribute certificate. The KRD 120*a* can send message, data, or information to the KDH 110 and receive message, data, or information from the KDH 110 in response to one or more of: 1) validating the attribute certificate 125*a* using the certificate signature of the AA 115; 2) validating the attribute certificate 125*a* using the signature of the manufacturer 102; or 3) upon validating the attribute certificate 125*a* per 1) and/or 2), determining that the attributes field of the attribute certificate 125*a* includes an ID of the KDH 110. The ID of the KDH 110 can include a MAC of the KDH 110, a hardware serial number of the KDH 110, a network address of the KDH 110, a location of the KDH 110, or another suitable ID of the KDH 110.

Figure 12:
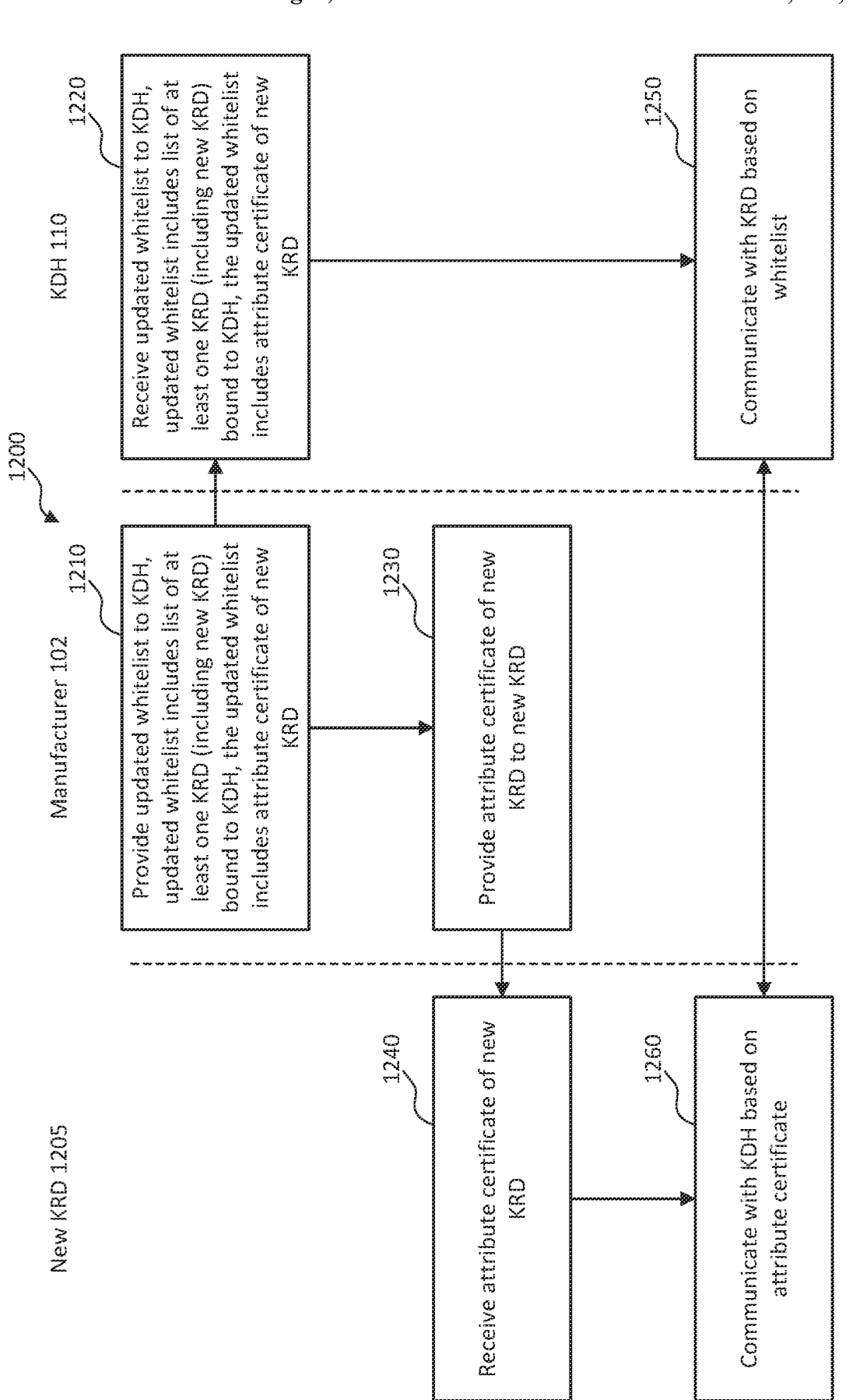
FIG. 12 is a flowchart diagram illustrating a key management method, according to some arrangements.

FIG. 12 is a flowchart diagram illustrating a key management method 1200, according to some arrangements. The method 1200 can be performed using the system 100. The dashed lines in FIG. 12 represent network (wireless or wired) or physical connection (e.g., cable) across which information and data can be communicated. The method 1200 can be used to add a new KRD 1205 to be bound to the KDH 110. The new KRD 1205 may be located close to the KDH 110 and remote from the manufacturer 102, such that the KDH 110 instead of the manufacturer 102 is configured to inject the attribute certificate into the new KRD 1205.

At 1210, the manufacturer 102 provides an updated whitelist to the KDH 110, the updated whitelist includes a list of at least one KRD (including the new KRD 1205) bound to the KDH 110. The updated whitelist includes the attribute certificate (e.g., the attribute certificate shown in FIG. 4) of the new KRD 1205. The updated whitelist can be a whitelist similar to the whitelist 150. For example, the manufacturer 102 generates the updated whitelist that provides an inventory of the KRDs bound to the KDH 110. The updated whitelist includes a list or set of the attribute certificates of the KRDs bound to the KDH 110 that are generated by the AA 115, the MAC of each of KRDs bound to the KDH 110, the hardware serial number of each of the KRDs bound to the KDH 110, the network address of each of KRDs bound to the KDH 110, the location of each of KRDs bound to the KDH 110, and so on. The manufacturer 102 can request the AA 115 to issue the attribute certificate for the new KRD 1205 and receives the attribute certificate of the new KRD 1205 from the AA 115. In some examples, the manufacturer 102 signs the updated whitelist using a digital signature of the manufacturer 102 and sends the updated whitelist to the KDH 110 via a network. The KDH 110 can validate the updated whitelist using the signature (e.g., the digital signature) of the manufacturer 102 and a certificate (e.g., an X.509 certificate) of the manufacturer 102 issued from a trusted CA (e.g., the CA 130 or another suitable CA). The KDH 110 can validate the attribute certificates using the certificate signature of the AA 115, included in the certificate signature fields of the attribute certificates. At 1220, the KDH 110 receives the updated whitelist.

At 1230, the manufacturer 102 provides the attribute certificate of the new KRD 1205 to the new KRD 1205. The attribute certificate indicates that the new KRD 1205 is bound to the KDH 110. For example, the attribute certificate of the new KRD 1205 in the attributes field can include a value corresponding to an ID the KDH 110. The ID can include a MAC of the KDH 110, a hardware serial number of the KDH 110, a network address of the KDH 110, a location of the KDH 110 or another suitable ID of the KDH 110. The new KRD 1205 can validate the attribute certificate using the certificate signature of the AA 115, included in the certificate signature fields of the attribute certificate. The manufacturer 102 can request that the AA 115 provide the attribute certificate. The AA 115 can provide the attribute certificate to the manufacturer 102, which then provides the attribute certificate to the new KRD 1205 by for example injecting the attribute certificate into the new KRD 1205 via a physical connection (e.g., via a physical cable or wired network) in some examples, and in other examples, via a wireless network. At 1240, the KRD 1205 receives the attribute certificate.

The new KRD 1205 and the KDH 110 can communicate with each other based on the attribute certificate and the whitelist 150. For example, at 1250 the KDH 110 can communicate with the new KRD 1205 based on the updated whitelist, similar to 1150. At 1260, the new KRD 1205 can communicate with the KDH 110 based on the attribute certificate of the new KRD 1205, similar to 1160.

Figure 13:
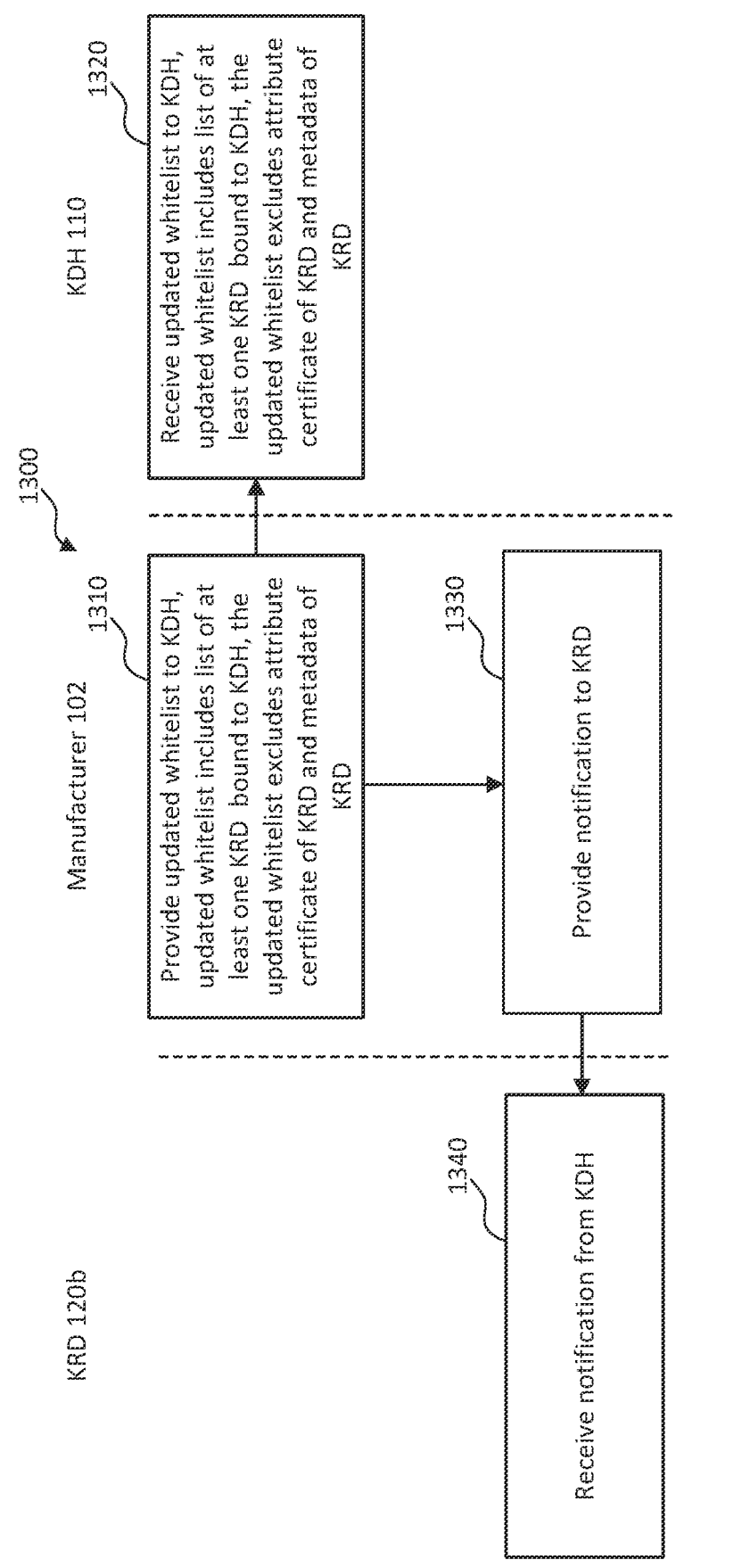
FIG. 13 is a flowchart diagram illustrating a key management method, according to some arrangements.

FIG. 13 is a flowchart diagram illustrating a key management method 1300, according to some arrangements. The method 1300 can be performed using the system 100. The dashed lines in FIG. 13 represent network (wireless or wired) or physical connection (e.g., cable) across which information and data can be communicated. The method 1300 can be used to unbind a previously bound KRD (e.g., the KRD 120*b*) from the KDH 110. The KRD 120*b* may be located close to the KDH 110 and remote from the manufacturer 102, such that the KDH 110 instead of the manufacturer 102 is configured to unbind the KRD 120*b*.

At 1310, the manufacturer 102 provides an updated whitelist to the KDH 110, the updated whitelist includes a list of at least one KRD bound to the KDH 110. The updated whitelist excludes the attribute certificate 125*b* of the KRD 120*b* and the metadata of the KRD 120*b* (e.g., the MAC of the KRD 120*b*, the hardware serial number of the KRD 120*b*, the network address of the KRD 120*b*, the location of the KRD 120*b*, another suitable ID of the KRD 120*b*, and so on). The updated whitelist can be a whitelist similar to the whitelist 150. In other examples, the manufacturer 102 can provide an explicit exclusion notification (including the MAC of the KRD 120*b*, the hardware serial number of the KRD 120*b*, the network address of the KRD 120*b*, the location of the KRD 120*b*, or another suitable ID of the KRD 120*b*) to the KDH 110 indicating that the KRD 120*b* is unbound from the KDH 110. At 1320, the KDH 110 receives the updated whitelist from the manufacturer 102

In some arrangements, at 1330, the manufacturer 120 provides a notification to the KRD 120*b* indicating that the KRD 120*b* is unbound from the KDH 110 and/or indicating that the KRD 120*b* is now bound to the manufacturer 102 (to prevent a DOS attach). The notification can be provided by the manufacturer 102 to the KRD 120*b* via a physical connection (e.g., via a physical cable or wired network) in some examples, and in other examples, via a wireless network. At 1340, the KRD 120*b* receives the notification from the manufacturer 102. The KRD 120*b* can remove, delete, or erase the attribute certificate 125*b* in response to receiving the notification.

Figure 14:
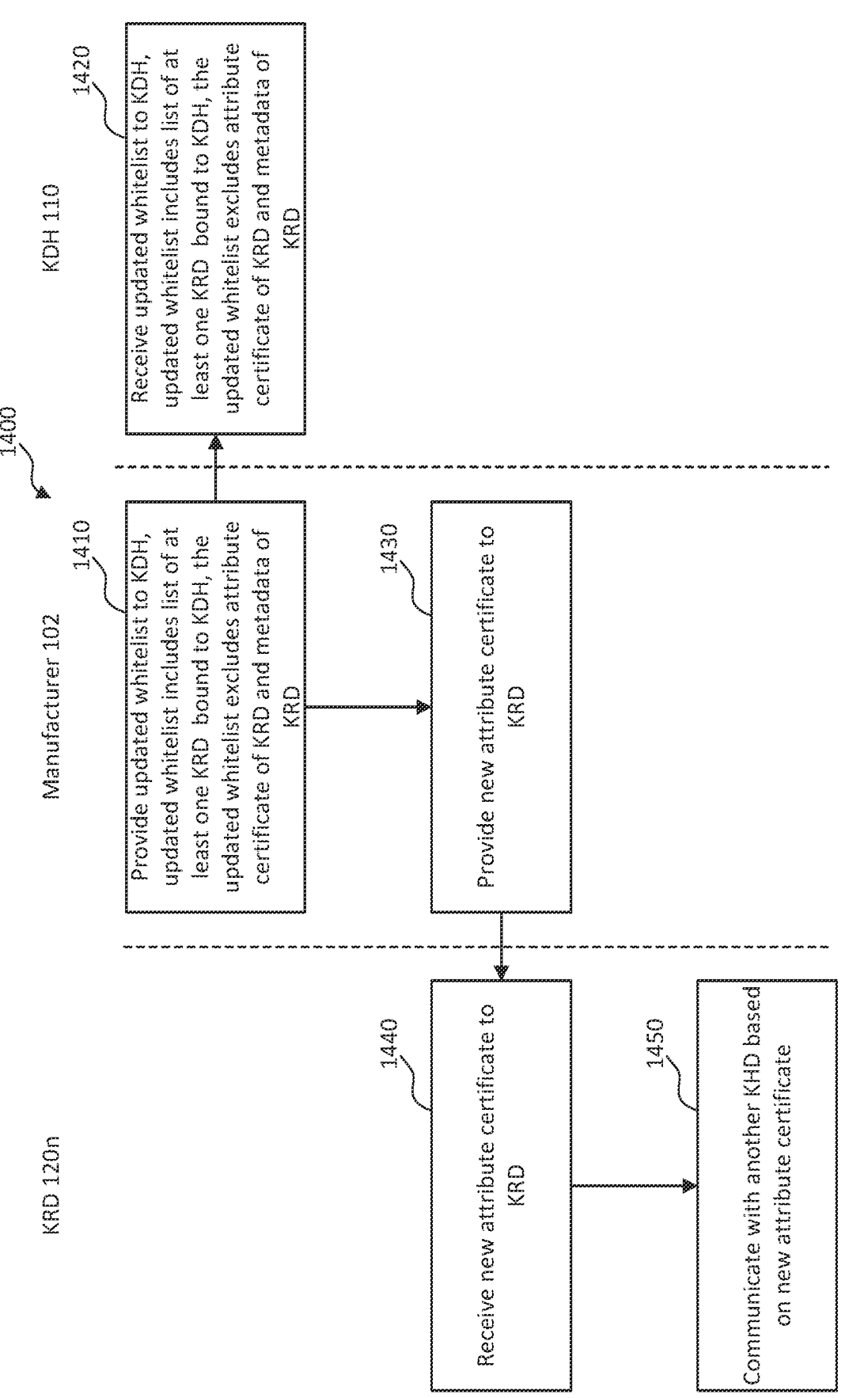
FIG. 14 is a flowchart diagram illustrating a key management method, according to some arrangements.

FIG. 14 is a flowchart diagram illustrating a key management method 1400, according to some arrangements. The method 1400 can be performed using the system 100. The dashed lines in FIG. 14 represent network (wireless or wired) or physical connection (e.g., cable) across which information and data can be communicated. The method 1400 can be used to modify the binding of the KRD 120*n* from the KDH 110 to another KDH, where the KRD 120*n* is previously bound to the KDH 110. The KRD 120*n* may be located close to the KDH 110 and remote from the manufacturer 102, such that the KDH 110 instead of the manufacturer 102 is configured to modify the binding of the KRD 120*n*. The another KDH can be a KDH similar to the KDH 110.

At 1410, the manufacturer 102 provides an updated whitelist to the KDH 110, the updated whitelist includes a list of at least one KRD bound to the KDH 110. The updated whitelist excludes the attribute certificate 125*n* of the KRD 120*n* and the metadata of the KRD 120*n* (e.g., the MAC of the KRD 120*n*, the hardware serial number of the KRD 120*n*, the network address of the KRD 120*n*, the location of the KRD 120*n*, another suitable ID of the KRD 120*n*, and so on). The updated whitelist can be a whitelist similar to the whitelist 150. In other examples, the manufacturer 102 can provide an explicit exclusion notification (including the MAC of the KRD 120*n*, the hardware serial number of the KRD 120*n*, the network address of the KRD 120*n*, the location of the KRD 120*n*, or another suitable ID of the KRD 120*n*) to the KDH 110 indicating that the KRD 120*n* is unbound from the KDH 110. At 1420, the KDH 110 receives the updated whitelist from the manufacturer 102

At 1430, the manufacturer 120 provides the new attribute certificate to the KRD 120*n*. The new attribute certificate indicates that the KRD 120*n* is bound to the another KDH different from the KDH 110 for key distribution. For example, the attributes field of the new attribute certificate includes a value corresponding to an ID the another KDH. The ID can include a MAC of the another KDH, a hardware serial number of the another KDH, a network address of the another KDH, or another suitable ID of the another KDH. The manufacturer 102 can request that the AA 115 provide the new attribute certificate. The AA 115 can provide the new attribute certificate to the manufacturer 102. The KRD 120*n* can validate the new attribute certificate using the certificate signature of the AA 115, included in the certificate signature fields of the new attribute certificate. The manufacturer 120 can provide (e.g., inject) the new attribute certificate via a physical connection (e.g., via a physical cable or wired network) in some examples, and in other examples, via a wireless network. At 1440, the KRD 120*n* receives the new attribute certificate.

The manufacturer 102 provides an updated whitelist to the another KDH, the updated whitelist includes a list of at least one KRD (including the KRD 120*n*) bound to the another KDH. The updated whitelist includes the attribute certificate of the KRD 120*n* indicating that the KRD 120*n* is bound to the another KDH. The updated whitelist includes a list or set of the attribute certificates of the KRDs bound to the another KDH that are generated by the AA 115 (including the new attribute certificate of the KRD 120*n*), the MAC of each of KRDs bound to the KDH 110 (including the MAC of the KRD 120*n*), the hardware serial number of each of the KRDs bound to the KDH 110 (including the hardware serial number of the KRD 120*n*), the network address (e.g., an IP address) of each of the KRDs bound to the KDH 110 (including the network address of the KRD 120*n*), a location (e.g., map coordinates, location identifiers, Global Positioning Service (GPS) coordinates, and so on) of each of the KRDs bound to the KDH 110 (including the location of the KRD 120*n*), and so on. In some examples, the manufacturer 102 signs the updated whitelist using a digital signature of the manufacturer 102 after and sends the updated whitelist to the another KDH via a network. The another KDH can validate the updated whitelist using the signature (e.g., the digital signature) of the manufacturer 102 and a certificate (e.g., an X.509 certificate) of the manufacturer 102 issued from a trusted CA (e.g., the CA 130 or another suitable CA). The another KDH can validate the attribute certificates using the certificate signature of the AA 115, included in the certificate signature fields of the attribute certificates.

At 1450, the KRD 120*n* can communicate with the another KDH based on the new attribute certificate (as described in 1160). The another KDH can use the updated whitelist to communicate with the KRD 120*n* (as described in 1150).

In some examples, in response to receiving a new attribute certificate indicating binding with another KDH, the KRD 120*n* immediately removes, erases, or deletes the previous attribute certificate (e.g., the attribute certificate 125*n*). In some examples, in response to receiving a new attribute certificate indicating binding with another KDH, the KRD 120*n* can communicate with both the KDH 110 and the another KDH for a period of time in response to receiving the new attribute certificate. The period of time can be a default period of time or a period of time provided by the KDH 110 along with the new attribute certificate. Examples of the period of time can be 1 minute, 5 minutes, 30 minutes, an hour, 2 hours, one day, one week, one month, or so on. This allows a migration period in which the KRD 120*n* is migrated from the KDH 110 to the another KDH. Accordingly, a KRD can communicate with multiple KDHs based on multiple attribute certificates.

As utilized herein, the terms "approximately," "substantially," and similar terms are intended to have a broad meaning in harmony with the common and accepted usage by those of ordinary skill in the art to which the subject matter of this disclosure pertains. It should be understood by those of ordinary skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Although only a few arrangements have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter described herein. For example, elements shown as integrally formed may be constructed of multiple components or elements, the position of elements may be reversed or otherwise varied, and the nature or number of discrete elements or positions may be altered or varied. The order or sequence of any method processes may be varied or re-sequenced according to alternative arrangements. Other substitutions, modifications, changes, and omissions may also be made in the design, operating conditions and arrangement of the various exemplary arrangements without departing from the scope of the present disclosure.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may include or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:

providing a first attribute certificate to a Key Receiving Device (KRD), wherein the first attribute certificate indicates that the KRD is bound to a first Key Distribution Host (KDH) for key distribution, wherein the key distribution comprises the first KDH distributing at least one symmetric key to the KRD;

providing a whitelist to the first KDH, wherein the whitelist comprises a list of at least one KRD bound to the first KDH for the key distribution, the at least one KRD comprising the KRD; and providing a second attribute certificate to the KRD indicating that the KRD is bound to a second KDH for the key distribution, wherein, in response to receiving the second attribute certificate, the KRD can communicate with the first KDH and the second KDH for a period of time before removing the first attribute certificate, and, wherein, at completion of the period of time, the KRD removes the first attribute certificate and all attribute certificates associated with the first KDH such that the KRD cannot communicate with the first KDH.

2. The method of claim 1, wherein providing the first attribute certificate comprises requesting an Attribute Authority (AA) to issue the first attribute certificate.

3. The method of claim 1, wherein providing the first attribute certificate to the KRD comprises injecting the first attribute certificate into the KRD.

4. The method of claim 1, further comprising providing a public key certificate to the KRD, wherein the public key certificate comprises a public key of the KRD, and the first attribute certificate corresponds to the public key certificate or the public key of the KRD.

5. The method of claim 4, wherein providing the public key certificate to the KRD comprises requesting a Certificate Authority (CA) to issue the public key certificate.

6. The method of claim 5, wherein the CA is associated with an Attribute Authority (AA) from which the first attribute certificate is issued.

7. The method of claim 1, wherein the whitelist comprises a list of attribute certificates, each attribute certificate of the list of attribute certificates corresponding to a respective one of the at least one KRD.

8. The method of claim 1, wherein the whitelist comprises, for each KRD of the at least one KRD, at least one of a Machine Address Code (MAC) or a hardware serial number.

9. The method of claim 1, wherein the whitelist comprises, for each KRD of the at least one KRD, at least one of a network address or a location.

10. The method of claim 1, further comprising:

providing an updated whitelist to the first KDH, the updated whitelist comprising a new KRD bound to the first KDH, the whitelist excludes the at least one KRD previously bound to the first KDH;

providing a new attribute certificate to the new KRD; and transmitting a notification to the KDR indicating the KDR is unbound to the first KDH and notifying the KDR to remove the attribute certificate.

11. The method of claim 10, wherein the updated whitelist comprises the new attribute certificate.

12. The method of claim 1, further comprising providing an updated whitelist to the first KDH, wherein the updated whitelist excludes the KRD previously bound to the first KDH.

13. The method of claim 12, wherein the updated whitelist excludes an identifier of the KRD previously bound to the first KDH.

14. A method, comprising:

receiving, by a first Key Distribution Host (KDH), a whitelist comprising a list of at least one Key Receiving Device (KRD) bound to the first KDH for key distribution, wherein the key distribution comprises the first KDH distributing at least one symmetric key to the KRD; and communicating with each of the at least one KRD for the key distribution based on the whitelist, wherein each of at least one KRD communicates with the first KDH based on a first attribute certificate indicating that each of the at least one KRD is bound to the first KDH for the key distribution;

wherein the at least one KRD receives a second attribute certificate indicating that the at least one KRD is bound to a second KDH for the key distribution, wherein, in response to receiving the second attribute certificate, the at least one KRD can communicate with the first KDH and the second KDH for a period of time before removing the first attribute certificate, and, wherein, at completion of the period of time, the KRD removes the first attribute certificate and all attribute certificates associated with the first KDH such that the KRD cannot communicate with the first KDH.

15. The method of claim 14, further comprising, in response to receiving the whitelist;

verifying the whitelist using a signature of a manufacturer;

storing in a memory information for the at least one KRD included in the whitelist in response to verifying the whitelist; and adding to the memory additional information for the at least one KRD, the additional information comprising a network address of each of the at least one KRD, a location of each of the at least one KRD, and a phone number of each of the at least one KRD.

16. The method of claim 14, wherein the whitelist comprises:

a list of attribute certificates, wherein each attribute certificate of the list of attribute certificates corresponds to a respective one of the at least one KRD; and for each KRD of the at least one KRD, at least one of a Machine Address Code (MAC) of each KRD, a hardware serial number, a network address, or a location.

17. The method of claim 14, further comprising one of:

receiving, by the first KDH, a first updated whitelist, wherein the first updated whitelist comprises a new KRD bound to the first KDH and providing, by the first KDH, a new attribute certificate to the new KRD; or receiving, by the first KDH, a second updated whitelist, wherein the second updated whitelist excludes the KRD previously bound to the first KDH and determines, by the KDH, that the KRD is unbound from the first KDH.

US 12,700,993 B2

21

18. A method, comprising:

receiving, by a Key Receiving Device (KRD), a first attribute certificate indicating that the KRD is bound to a first Key Distribution Host (KDH) for key distribution, wherein the key distribution comprises the first KDH distributing at least one symmetric key to the KRD;

communicating by the KRD with the first KDH for the key distribution based on the first attribute certificate, wherein the first KDH communicates with the KRD based on a whitelist comprising a list of at least one KRD bound to the first KDH for the key distribution, and wherein the at least one KRD comprises the KRD;

receiving, by the KRD, a second attribute certificate indicating that the KRD is bound to a second KDH for the key distribution;

in response to receiving the second attribute certificate, communicating, by the KRD, with the first KDH and the second KDH for a period of time before removing the first attribute certificate; and at completion of the period of time, removing, by the KRD, the first attribute certificate and all attribute certificates associated with the first KDH such that the KRD cannot communicate with the first KDH.

19. The method of claim 18, wherein:

the first attribute certificate is issued and signed by an Attribute Authority (AA);

the first attribute certificate is injected into each of the at least one KRD by a manufacturer;

a public key certificate issued and signed by a Certificate Authority (CA) is provided to each of the at least one KRD; and the CA is associated with the AA.

*  *  *  *  *